United States Patent
Dhaliwal et al.

(10) Patent No.: US 10,214,632 B2
(45) Date of Patent: Feb. 26, 2019

(54) CRYSTALLINITY MODIFIER FOR POLYOLEFINS

(71) Applicant: INDIAN OIL CORPORATION LIMITED, Mumbai (IN)

(72) Inventors: Jatinder Singh Dhaliwal, Haryana (IN); Vishal Goel, Haryana (IN); Shiva Naresh, Haryana (IN); Priyanka Luthra, Haryana (IN); Sameeksha Raizada, Haryana (IN); Gurpreet Singh Kapur, Haryana (IN); Shashi Kant, Haryana (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 15/380,257

(22) Filed: Dec. 15, 2016

(65) Prior Publication Data

US 2017/0174865 A1    Jun. 22, 2017

(30) Foreign Application Priority Data

Dec. 17, 2015 (IN) .......................... 4738/MUM/2015

(51) Int. Cl.
| | | |
|---|---|---|
| *C08K 9/08* | (2006.01) | |
| *C08K 9/04* | (2006.01) | |
| *C08K 5/098* | (2006.01) | |
| *C08K 5/00* | (2006.01) | |

(52) U.S. Cl.
CPC ................ *C08K 9/04* (2013.01); *C08K 5/098* (2013.01); *C08K 5/0083* (2013.01)

(58) Field of Classification Search
CPC .............. C08K 3/26; C08K 2003/2206; C08K 2003/265; C08K 9/04; C08K 5/098; C08K 5/0083; C01F 7/005; C01F 11/00; C01F 11/02; C01F 11/18
See application file for complete search history.

(56) References Cited

U.S. PATENT DOCUMENTS

| | | | |
|---|---|---|---|
| 3,539,306 A | | 11/1970 | Kumura et al. |
| 5,231,126 A | | 7/1993 | Shi et al. |
| 5,326,891 A | * | 7/1994 | Breuer ................... B01J 23/007 534/16 |
| 6,737,464 B1 | * | 5/2004 | Bagrodia ................. C08K 7/00 501/145 |
| 2008/0300352 A1 | * | 12/2008 | Schomaker ........... C01B 13/363 524/381 |
| 2009/0292052 A1 | | 11/2009 | Sauerwein et al. |

FOREIGN PATENT DOCUMENTS

| | | |
|---|---|---|
| DE | 3610644 A1 | 10/1986 |
| EP | 0177961 A2 | 4/1986 |
| EP | 0682066 A1 | 11/1995 |
| EP | 0910131 A1 | 4/1999 |
| EP | 0557721 B1 | 4/2000 |
| WO | 03/059917 A1 | 7/2003 |

* cited by examiner

*Primary Examiner* — James A Fiorito
(74) *Attorney, Agent, or Firm* — Maschoff Brennan

(57) ABSTRACT

The present invention relates to a novel and economical process for modification of acid scavenger to be used not only for neutralizing the effect of catalyst residue but as well as crystallinity modifier in polyolefins. More particularly, the present invention discloses a process for modification of acid scavenger to be used as dual functional additive as acid scavenger as well as crystallinity modifier in polyolefins, said process comprising treating an acid scavenger with an organic dibasic acid to obtain a modified acid scavenger, wherein the acid scavenger is calcium aluminum hydroxy carbonate having chemical formula $Ca_4Al_2(OH)_{12}CO_3 \cdot nH_2O$, where n=4-5.

7 Claims, No Drawings

CRYSTALLINITY MODIFIER FOR POLYOLEFINS

FIELD OF THE INVENTION

The present invention discloses a novel and economical process for modification of acid scavenger for its use in polyolefins as an acid scavenger as well as crystallinity modifier to yield polyolefin material. More particularly, the present invention discloses a process for modification of acid scavenger to be used as dual functional additive as acid scavenger as well as crystallinity modifier in polyolefins, said process comprising treating an acid scavenger with an organic dibasic acid to obtain a modified acid scavenger, wherein the acid scavenger is calcium aluminium hydroxy carbonate having chemical formula $Ca_4Al_2(OH)_{12}CO_3 \cdot nH_2O$, where n=4-5.

BACKGROUND OF THE INVENTION

The process of manufacturing of Polyolefin, namely polyethylene (PE) and polypropylene (PP), involves use of various additives such as antioxidants, heat stabilizers, UV stabilizers, acid scavengers, antistatic agents, or any other additive to maintain or enhance the performance of the final polymer. In addition to this special additives are used such as crystallinity modifiers which further augment some of the properties of the resin such as increase in clarity of polymers, cycle time reduction by way of increasing the Tc or the polymer exhibits two Tm one at lower temperature and second one at higher temperature thereby broadening the processing window of especially semi crystalline polyolefin polymers. This type of property of a polyolefin polymer increases its application areas and processor can make niche products.

However, to achieve such properties in a polymer requires addition of number of chemical compounds known as additives and commercially a manufacturing unit spends more capital expenditure to install number of bins for individual additives to dose the same during extrusion stage. Therefore, the call of the day is that if one can use a single additive having a capability of performing two functions can lead to trim down the capital expenditure by slashing the number of bins to be installed in a manufacturing unit.

Synthesis of various polymers involves use of a different catalyst, co-catalyst and promoters. Though now-a-days the activity of these catalyst and co-catalyst system used in synthesis of polymers is high but still the catalytic residues left over from the reactions can even now provoke the multitude of post reactor difficulties. Most of the catalysts used for production of Polyethylene and Polypropylene belong to family of Zeigler Natta Catalysts. Ziegler-Natta catalysts utilize transition metal and late transition metal salts of group III and IV of the periodic table supported on Magnesium Chloride and alkyl aluminums and/or chloride containing alkyl aluminum as co-catalysts. It is particularly the chloride associated with these catalysts, co-catalysts and support which can be corrosive to the melt processing equipment and can reduce the thermal and light stability of the polymers in which they are contained and can also promote the degradation of the polymer chains in the finished material. The presence of chloride ions in PP and PE can result in the formation of hydrochloric acid [HCl] and other acids if not properly scavenged. Hydrochloric acid can degrade the polymer and produce unwanted color formation (yellowing) in the pellets. To neutralize the effect of catalyst or co-catalyst residue acid scavengers are used in ppm level in polymer matrix. Scavenger additives are added to bind up chloride [Cl−] ions left from the co catalysts.

Different types of acid scavengers are available and some of the commonly used acid scavengers are the metallic stearates, metallic oxides, synthetic hydrotalcites etc. These metallic stearates are compounds of long-chain fatty acids with metals of different valencies. The most important metallic stearates, in terms of quantity, are the metallic stearates of, Sodium, aluminium, calcium, magnesium and zinc. Apart from their function to neutralize the acidity, they also work as internal and external slipping/lubricating agents.

U.S. Pat. No. 3,539,306 discloses a process for preparation of hydrotalcite which compromises mixing an aluminum component such as magnesium salt in an aqueous medium in presence of carbonate ion and thereafter recovering the resultant product.

WO03/059917 relates to invention describing synthesis of novel synthetic hydrotalcites and their uses. Also, synthetic hydrotalcites can be made from organic anions longer than $C_4$, and also from organic anions with functional groups including saturated carboxylates of $C_6$, $C_8$, $C_{10}$ and $C_{18}$, straight chain acids; aromatics such as benzoates, chloro benzoates etc.

Japanese patent application no. 96-189168 discloses naturally occurring hydrotalcites containing a carbonate anion were used in polypropylene synthesis, along with other additives, and are said to give good melt flow index, flexural modulus and izod impact strength.

EP0910131 describes the use of naturally occurring hydrotalcites containing carbonate anion in an ethylene vinyl acetate copolymer and are said to produce a film with good adhesion and barrier properties.

JP86296799 patent discloses use of naturally occurring hydrotalcites containing carbonate anion in linear low density polyethylene and said to produce film which has thermal insulating properties and good tensile strength.

US20090292052A1 relates to process for preparing calcium carbonate hydroxodialuminates which having hexagonal platelet shaped crystal habit and further discloses the aluminates thus obtained in compositions and stabilizer systems and to the use thereof.

Polypropylene is known to have three crystalline phases, α, β and γ phases besides amorphous phase. Polypropylene crystallizes to α form (monoclinic) which is the most thermodynamically stable form. Polypropylene, however, may also crystallize in the β-form (hexagonal) and in γ-form (orthorhombic). The β-modification is characterized by improved mechanical properties, in particular improved impact strength and improved resistance to stress cracking. Another class of additives incorporated into Polyolefins are Nucleating agents.

Nucleating agents are used in polymer resin to manufacture of plastic articles by various methods, including by injection or extrusion molding. It helps to achieve a polymer significant cycle time reduction in the molding process compared to using non nucleated polymer. Cycle time reduction can be achieved in molded part by inducing in the resin a higher Tc (crystallization temperature). This decreases the necessary cooling time and facilitates ejection of the articles from the mold at a faster rate than would be possible without the use of a nucleating agent. Another class of nucleating agents used specifically for polypropylene are the beta nucleating agents. They lead to increase in impact strength, lower melting temperature and possibility of altogether different set of applications.

EP0177961A2 discloses the process by which β-modification is achieved by shear induced crystallization or by crystallization under temperature gradient or by adding specific β-nucleating agents, such as quinacridone pigments. These quinacridone pigments even when added in low amounts leads to discoloration in polypropylene.

U.S. Pat. No. 5,231,126A and DE 3610644A1 discloses two component type beta nucleating agent and it consisted of a mixture of a organic dibasic acid, such as pimleic acid, azelaic acid, o-phthalic acid, terephthalic and isophthalic acid with an oxide, hydroxide or acid salt of a Group II metal e.g. magnesium, Calcium, Stronium etc. which when employed in Polypropylene matrix gave beta crystalline structure. Drawback of this prior art is that insufficient reproducibility effect of the two-component β-nucleating agent.

EP0682066A1 discloses the method to prepare in situ generated β-Nucleating agent for increasing the content of β-modification in polypropylene.

The beta nucleation effect of various dicarboxamides, in particular N,N-dicyclohexyl-2,6-napthalenedicarboxamide is described in EP-0557721. The disadvantage of this nucleator is the high starting material costs and complicated synthetic steps involved in preparation.

EP0682066A1 discloses one component β-nucleating agent preparation, an attempt for achieving a more reliable β-modification. A drawback of one component β-nucleating agent is that it contains 1 mol of crystal water which tends to decrease the effect of β-nucleation.

JP06279378 discloses the compound useful as a β-crystal nucleus agent for crystallizable PP resin easily, efficiently and in a high yield by subjecting a naphthalene dicarboxylic acid dialkyl and an amine to ester-amide exchange reaction.

Polymer 49 (2008) 2745-2754 demonstrates the use of cadmium bicyclo[2.2.1]hept-5-ene-2,3-dicarboxylate (BCHE30) as an effective β-nucleating agent for isotactic polypropylene.

JAPS 123 (2012) 108-117, discloses use of Hexahydrophthalic barium (HHPA-Ba) as β-nucleating agent.

SUMMARY OF THE INVENTION

It has been found that calcium aluminium hydroxy carbonate an acid scavenger after modification as per present invention acts as crystallinity modifier for polyolefins and retains its acid scavenging property i.e. neutralizing the effect of catalyst residue.

The process disclosed holds many advantages to the existing prior art.
Reduction in installation of dosing bins thereby reducing the capital cost of the project.
Lower starting materials cost leading to cost effective additive.
No complicated synthesis steps involved in modification.
No compatibility issues with other additives (e.g. antioxidants etc.) used in Polyolefins.

According to the present invention, the process disclosed herewith does not need any high temperature or pressure or sophisticated equipment or purification steps required, whole synthesis process can be carried out at ambient temperature and no pressure.

The present invention solves the long felt need of compatibility issues with other additives used in Polypropylene e.g. Acid scavengers, antioxidants etc.

Accordingly the present invention provides a process for modification of acid scavenger to be used as dual functional additive as acid scavenger as well as crystallinity modifier in polyolefins, said process comprising treating an acid scavenger with an organic dibasic acid to obtain a modified acid scavenger, wherein the acid scavenger is calcium aluminium hydroxy carbonate having chemical formula $Ca_4Al_2(OH)_{12}CO_3 \cdot nH_2O$, where n=4-5.

In one embodiment of the present invention, the dibasic acid is selected from the group comprising of pimelic acid, suberic acid, azelaic acid, o-phthalic acid, terephthalic acid and the like.

In one embodiment of the present invention, the acid scavenger is treated with the organic dibasic acid without any solvent in a dry method.

In yet another embodiment of the present invention, in dry method, mixture of acid scavenger and dibasic acid is subjected to a heat treatment at a temperature in the range of 120° C. to 160° C. In one of the specific embodiment, the mixture of acid scavenger and dibasic acid is subjected to a heat treatment at a temperature not above the decomposition temperature of the organic dibasic acid or degradation of acid scavenger.

In still an embodiment of the present invention, the heat treatment in the dry method is carried out for a period of time in the range of 30 minutes to 3 hours.

In one embodiment of the present invention, the acid scavenger is treated with the organic dibasic acid in presence of an organic solvent in a wet method.

In yet another embodiment of the present invention, in wet method the organic solvent is selected from the group comprising of acetone, ethanol, and methanol and the like.

In still an embodiment of the present invention, in wet method, a premixing of the dibasic acid in the organic solvent is carried out at temperature between 10 to 40° C. In one of the specific embodiment, premixing of the dibasic acid in an organic solvent is carried out at temperature should not exceed beyond the boiling point of the organic solvent or degradation temperature of the acid scavenger.

In still an embodiment of the present invention, time for premixing of the dibasic acid in the organic solvent in the wet method is in the range of 30 minutes to 2 hours.

In still an embodiment of the present invention, the acid scavenger is treated with the organic dibasic acid in presence of the organic solvent in the wet method for 30 minutes to 8 hours.

In one embodiment of the present invention, weight ratio of acid scavenger to dibasic organic acid is in the range of 10:10-0.1. In another embodiment of the present invention, weight ratio of acid scavenger to dibasic organic acid is in the range of 10:3-0.5. In another embodiment of the present invention, weight ratio of acid scavenger to dibasic organic acid is in the range of 10:2-1.

In one embodiment of the present invention, mole ratio of acid scavenger to dibasic organic acid is in the range of 10:10-0.1. In another embodiment of the present invention, weight ratio of acid scavenger to dibasic organic acid is in the range of 10:3-0.5. In another embodiment of the present invention, weight ratio of acid scavenger to dibasic organic acid is in the range of 10:2-1.

In one embodiment of the present invention, the modified acid scavenger is subject to milling treatment to obtain a fine powder having a weight average particle size of from 1 to 10 μm. In another embodiment of the present invention, the modified acid scavenger is subject to milling treatment to obtain a fine powder having a weight average particle size of from 2 to 7 μm. In another embodiment of the present invention, the modified acid scavenger is subject to milling treatment to obtain a fine powder having a weight average particle size of from 3 to 6 μm.

In one embodiment of the present invention, the modified acid scavenger is used as acid scavenger as well as crystallinity modifier in polyolefins and is used in amounts of from 0.001 to 5 wt. % on the basis of the polymer/polyolefins content. In another embodiment of the present invention, the modified acid scavenger is used in polyolefins in amounts of from 0.01 wt. % to 3 wt. % on the basis of the polymer/polyolefins content. In another embodiment of the present invention, the modified acid scavenger is used in polyolefins in amounts of from 0.1% to 1 wt. % on the basis of the polymer/polyolefins content.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

According to main embodiment, the present invention provides a novel and economical process for modification of acid scavenger to be used as dual functional additive such as acid scavenger as well as crystallinity modifier in polyolefins. As like prior art processes, this process does not employ a high temperature for treatment or expensive solvents or purification steps and shows good modification in crystallinity when used in polyolefins.

According to another embodiment, the Acid scavenger i.e. hydrotalcites are double layered hydroxides that contain positively charged hydroxide layers and charge balancing anions located in the interlayer region e.g. $Mg_{4.3}Al_2(OH)_{12.6}CO_3 \cdot nH_2O$, $Ca_4Al_2(OH)_{12}CO_3 \cdot nH_2O$ (calcium aluminium hydroxy carbonate) etc.

According to further embodiment, the present invention is directed to the modification of acid scavenger through a novel and economical process by treating calcium aluminium hydroxy carbonate $(Ca_4Al_2(OH)_{12}CO_3 \cdot nH_2O$ where n=4-5) an acid scavenger with a mixture comprising of organic dibasic acid such as pimelic acid, azelaic acid, o-phthalic acid etc. in an organic solvent such as acetone, ethanol, methanol etc. or alone organic dibasic acid.

In the preferred embodiment, the dibasic in accordance with present invention may be selected among dibasic organic acids comprising four of more carbon atoms. Preferred examples of the dibasic acid are pimelic acid, suberic acid, azelaic acid, o-phthalic acid, terephthalic acid etc. These acids can be used as alone or in any desired admixture. Preferred are pimelic acid and suberic acid. The dibasic organic acid may be used in any desired ratio, suitable do mixtures comprise higher or equal amount to the acid scavenger.

In the method in accordance with the present invention, organic dibasic acid can be admixed as such with the acid scavenger (dry method) or it can be added to the mixture comprising of organic dibasic acid and organic solvent (wet method). For dry method, mixture of acid scavenger and dibasic acid in desired ratio to be subjected to a heat treatment at a temperature of 120° C. or more, preferably 140° C. or more and most preferably 150° C. or more. A particular suitable treatment temperature is about 160° C. The heat treatment may be carried out for a period of time suitable for giving rise to the desired one-component β-nucleating agent in accordance and typical examples of treatment times are 30 minutes or longer, more preferably 1 hour or longer, and in particular 1.5 hours or longer, such as about 3 hours. This heat treatment is typically carried out at ambient pressure, either in the presence of air or in the presence of an inert gas, such as nitrogen. The upper limit for the temperature is not critical, however, the temperature should not be above the decomposition temperature of the organic dibasic acid or degradation of acid scavenger.

In case of wet method, Premixing of the dibasic acid in an organic solvent may be carried out preferably at temperature between 10 to 40° C. or temperature should not exceed beyond the boiling point of the organic solvent or degradation temperature of the acid scavenger. Time for premixing is 30 minutes or longer, more preferably 1 hour or longer, and in particular 1.5 hours or longer, such as about 2 hours. The premixing is carried out at ambient pressure, either in presence of air or in presence of inert gas, such as nitrogen.

In case solvent used for premixing dibasic acid, vacuum oven or hot air oven may be used. Temperature for vacuum drying or hot air drying of acid scavenger with mixture of dibasic acid and organic solvent may be kept between 50° C. to 150° C. Time for vacuum drying or hot air drying may be 30 minutes or longer, more preferably 4 hour or longer, and in particular 6 hours or longer, such as about 8 hours. Drying is carried out at ambient pressure, either in presence of air or in presence of inert gas, such as nitrogen. Both acid scavenger and dibasic acid after mixing or before mixing in any desired can be heated to the temperatures not exceeding the boiling temperature of dibasic acid or degradation temperature of acid scavenger. Time for heating may be 30 minutes or longer, more preferably 4 hour or longer, and in particular 6 hours or longer, such as about 8 hours. After treatment (wet or dry method) the obtained compound may be further be subjected to post treatments, in particular after having been cooled down to room temperature.

Treatment may be carried out in any desired and suitable device, including stirred vessels as well as fluidized bed reactors. Mortar pestle or any jacketed vessel with temperature controls or ball mill grinding with or without heating can be used in case of dry method. These devices, which are well known to the skilled person, enable an efficient premixing or treatment.

The organic dibasic acid and the acid scavenger may be employed in any desired ratio. Suitable mixtures will comprise of higher or lower or equal amounts of acid scavenger than that of dibasic acid. However preferred does use of a mixture comprise a high excess of acid scavenger. Suitable ratios of acid scavenger to dibasic organic acid are as follows:

Weight ratio: 10:10-0.1, in particular, 10:3-0.5; more preferably, 10:2-1

Mole ratio: 10:10-0.1, in particular, 10:3-0.5; more preferably, 10:2-1

It is preferred to subject the dried powder to further milling treatment to obtain a fine powder having a weight average particle size of from 1 to 10 μm, preferably 2 to 7 μm and in particular 3 to 6 μm.

The compound obtained in accordance with the present invention may be used in particular form, preferably as fine powder when adding to polyolefin's. Compound thus obtained may be used as fine powder or in form of master batch, use as fine powder is preferred.

The compound, modified calcium aluminium hydroxy carbonate, thus obtained (using wet or dry method) by the present invention may be used in polyolefins like polypropylene can be used as compositions in amounts of from 0.001 to 5 wt. %, preferably 0.01 wt. % to 3 wt. % such as from 0.1% to 1 wt. % or in form of mole ratio (calculated on the basis of the polymer content).

The compound thus obtained in accordance with the present invention may be added to polyolefins like polypropylene (homopolymer, copolymer, including random copolymers as well as block copolymers). The polypropylenes are typically stereoregular polypropylenes, such as isotactic polypropylenes as well as elastomeric polypropylenes having a degree of stereo regularity of preferably 80% or more. Stereo regularity is preferably determined by 13C-NMR spectroscopy in solution as described e.g. by Busico et al. in Macromolecules 28 (1995) 1887-1892, taking the isotactic pentad regularity (mmmm) as measure of stereoregularity.

The following examples are illustrative of the invention but not to be construed to limit the scope of the present invention.

Examples

TABLE 1

Shows various compounds formed:

| Compound | Calcium aluminium hydroxy carbonate (grams) | Pimelic Acid (grams) | Comment | Parameters | Treatment |
|---|---|---|---|---|---|
| β1 | 10.00 | 10.00 | wt. by wt. | Wet method | 25° C./4 Hrs |
| β2 | 10.00 | 1.00 | wt. by wt. | Wet method | 25° C./4 Hrs |
| β3 | 17.04 | 4.80 | Equimolar mixture | Wet method | 25° C./4 Hrs |
| β4 | 10.00 | 10.00 | wt. by wt. | Dry Method | 160° C./3 Hrs |
| β5 | 17.04 | 4.80 | Equimolar mixture | Dry Method | 160° C./3 Hrs |

Compounds β1, β2 and β3 were prepared by treating calcium aluminium hydroxy carbonate (CAHC) with mixture of pimelic acid and acetone at room temperatures for 4 hours, then putting the mixtures into a vacuum oven at 50° C. for 2 hours. After cooling to room temperature all mixtures were milled to a fine powder with an average particle size of 4-6 μm.

Compounds β4 and β5 were prepared by subjecting mixture of calcium aluminium hydroxy carbonate and pimelic acid to a heat treatment at a temperature of 160° C. for 3 hours. After cooling to room temperature all mixtures were milled to a fine powder with an average particle size of 4-6 μm.

TABLE 2

Shows the formulations prepared using modified Calcium aluminium hydroxy carbonate in Polypropylene (Homopolymer, Random copolymer and Impact copolymer)

| S. No. | Formulation | Polypropylene | MFI (g/10 min) | Compound |
|---|---|---|---|---|
| 1 | Example 1 | Homo Polypropylene | 11 | β1 |
| 2 | Example 2 | Random Copolymer | 12 | β1 |
| 3 | Example 3 | Impact Copolymer | 03 | β1 |
| 4 | Example 4 | Homo Polypropylene | 03 | β1 |
| 5 | Example 5 | Homo Polypropylene | 11 | β2 |
| 6 | Example 6 | Homo Polypropylene | 11 | β3 |
| 7 | Example 7 | Homo Polypropylene | 11 | β4 |
| 8 | Example 8 | Homo Polypropylene | 11 | β5 |
| 9 | Example 9 | Homo Polypropylene | 11 | β6 |

TABLE 3

Illustrates the mixtures 1-7 of example 1 evaluated using compound β1

| Mixture | Dosage |
|---|---|
| 1 | 0 ppm |
| 2 | 500 ppm |
| 3 | 1000 ppm |
| 4 | 2000 ppm |
| 5 | 5000 ppm |
| 6 | 1% |
| 7 | 2% |

TABLE 4

Illustrates the mixtures 8-13 of example 2 evaluated using compound β1

| Mixture | Dosage |
|---|---|
| 8 | 0 ppm |
| 9 | 250 ppm |
| 10 | 500 ppm |
| 11 | 1000 ppm |
| 12 | 2000 ppm |
| 13 | 5000 ppm |

TABLE 5

Illustrates the mixtures 14-16 of example 3 evaluated using compound β1

| Mixture | Dosage |
|---|---|
| 14 | 0 ppm |
| 15 | 1000 ppm |
| 16 | 2000 ppm |

TABLE 6

Illustrates the mixtures 17-19 of example 4 evaluated using compound β1

| Mixture | Dosage |
|---|---|
| 17 | 0 ppm |
| 18 | 1000 ppm |
| 19 | 2000 ppm |

TABLE 7

Illustrates the mixtures 20-21 of example 5 evaluated using compound β2

| Mixture | Dosage |
|---|---|
| 20 | 1000 ppm |
| 21 | 2000 ppm |

TABLE 8

Illustrates the mixtures 22-23 of example 6 evaluated using compound β3

| Mixture | Dosage |
|---|---|
| 22 | 1000 ppm |
| 23 | 2000 ppm |

TABLE 9

Illustrates the mixtures 24-25 of example 7 evaluated using compound β4

| Mixture | Dosage |
|---|---|
| 24 | 1000 ppm |
| 25 | 2000 ppm |

TABLE 10

Illustrates the mixtures 26-27 of example 8 evaluated using compound β5

| Mixture | Dosage |
|---|---|
| 26 | 1000 ppm |
| 27 | 2000 ppm |

TABLE 11

Illustrates the mixture 28 of example 9 evaluated using compound β6

| Mixture | Dosage |
|---|---|
| 28 | 1000 ppm |

Recipes and Results:

A polypropylene (homopolymer, random and impact) having MFI (11 g/10 min and 03 g/10 min; 12 g/10 min; and 03 g/10 min) was mixed with 0.35% pentaerthrityl-tetrakis (3-(3',5'-di-tert.Butyl-4-hydroxyphenyl)-propionate (supplied as Irganox 1010, BASF) and 0.70% tris(2,4-di-t-butyl-phenyl) phosphate (supplied as Irgafos 168, BASF). Modified calcium aluminium hydroxy carbonate was added as a part of each formulation in amounts as mentioned in mixtures 1 to 27. Formulations were extruded using an extruder at a melt temperature of 230° C. No acid scavenger was added in any formulation.

Coarse grained powders were milled down to fine free flowing powder free of agglomerates was thus obtained.

In mixture 28, polypropylene (homopolymer) having MFI (11 g/10 min) was mixed with 0.1% of calcium aluminium hydroxy carbonate and pimelic acid in 1:1 wt. ratio, 0.35% pentaerthrityl-tetrakis(3-(3',5'-di-tert.Butyl-4-hydroxyphenyl)-propionate (supplied as Irganox 1010, BASF) and 0.70% tris(2,4-di-t-butyl-phenyl) phosphate (supplied as Irgafos 168, BASF) and extruded on extruder at melt temperature of 230° C. No acid scavenger was added in the formulation.

The obtained products were evaluated and the results are shown in the following table.

Melting and crystallization temperatures of various formulations have been obtained using differential scanning calorimeter machine (DSC). All the experiments were performed under inert atmosphere ($N_2$ gas).

Wide-angle X-ray scattering (WAXD) patterns were recorded for determination of beta crystal form ("k") in polypropylene according to standard procedures described in the literature (Turner-Jones, A.; Aizlewood, J. M.; Beckett, D. R. Makromol Chem 1964, 75, 134) employing the relation $$k = \frac{H\beta}{H\beta + H\alpha(110) + H\alpha(040) + H\alpha(130)}$$

where $H\alpha(110)$, $H\alpha(040)$ and $H\alpha(130)$ are the heights of the strong peaks of the alpha form respectively and $H\beta$ is the height of strong beta peak (300). The k value is zero in the absence of beta form in polypropylene.

TABLE 12

Illustrates the peak melting and crystallization temperatures and k-value of PP-Homopolymer (11 g/10 min) mixed with modified calcium aluminium hydroxy carbonate

| β1 | $T_m$ Alpha (° C.) | $T_m$ Beta (° C.) | Tc (° C.) | k-value |
|---|---|---|---|---|
| 0% mixture 1 | 163 | — | 121.6 | — |
| 0.05% mixture 2 | 164.1 | 153.4 | 124.2 | 0.94 |
| 0.1% mixture 3 | 164.5 | 153.9 | 124.7 | 0.94 |
| 0.2% mixture 4 | 164.6 | 152.9 | 124.8 | 0.95 |
| 0.5% mixture 5 | 164.1 | 152.6 | 125.4 | 0.95 |
| 1% mixture 6 | 164.5 | 152 | 125.9 | 0.94 |
| 2% mixture 7 | 163.8 | 153.2 | 125.4 | 0.94 |

TABLE 13

Illustrates the peak melting and crystallization temperatures and k-value of PP-Random copolymer (MFI 12 g/10 min) mixed with modified calcium aluminium hydroxy carbonate

| β1 | $T_m$ Alpha (° C.) | $T_m$ Beta (° C.) | Tc (° C.) | k-value |
|---|---|---|---|---|
| 0% mixture 8 | 149 | — | 104.8 | — |
| 0.025% mixture 9 | 147 | 134 | 110.3 | 0.20 |
| 0.05% mixture 10 | 147 | 134 | 110.8 | 0.33 |
| 0.1% mixture 11 | 148 | 135 | 111.4 | 0.36 |
| 0.2% mixture 12 | 148 | 135 | 112.7 | 0.41 |
| 0.5% mixture 13 | 148 | 136 | 112.9 | 0.46 |

TABLE 14

Illustrates the peak melting and crystallization temperatures and k-value of PP-impact copolymer (MFI 03 g/10 min) mixed with modified calcium aluminium hydroxy carbonate

| β1 | $T_m$ Alpha (° C.) | $T_m$ Beta (° C.) | Tc (° C.) | k-value |
|---|---|---|---|---|
| 0% mixture 14 | — | 164.1 | 120.6 | — |
| 0.1% mixture 15 | 165.4 | 154.3 | 126.8 | 0.97 |
| 0.2% mixture 16 | 165.4 | 155.3 | 127.2 | 0.98 |

TABLE 15

Illustrates the peak melting and crystallization temperatures and k-value of PP-homopolymer (MFI 03 g/10 min) mixed with modified calcium aluminium hydroxy carbonate

| β1 | $T_m$ Alpha (° C.) | $T_m$ Beta (° C.) | Tc (° C.) | k-value |
|---|---|---|---|---|
| 0% mixture 17 | 163.4 | — | 116.3 | — |
| 0.1% mixture 18 | 165.2 | 153.1 | 123.5 | 0.94 |
| 0.2% mixture 19 | 164.8 | 154.9 | 122.8 | 0.94 |

TABLE 16

Illustrates the peak melting and crystallization temperatures and k-value of PP-homopolymer (MFI 11 g/10 min) mixed with modified calcium aluminium hydroxy carbonate

| β1 | $T_m$ Alpha (° C.) | $T_m$ Beta (° C.) | Tc (° C.) | k-value |
|---|---|---|---|---|
| 0.1% mixture 20 | 164.7 | 151.7 | 122.4 | 0.90 |
| 0.2% mixture 21 | 164.7 | 151.4 | 122.1 | 0.91 |

TABLE 17

Illustrates the peak melting and crystallization temperatures and k-value of PP-homopolymer (MFI 11 g/10 min) mixed with modified calcium aluminium hydroxy carbonate

| β3 | $T_m$ Alpha (° C.) | $T_m$ Beta (° C.) | Tc (° C.) | k-value |
|---|---|---|---|---|
| 0.1% mixture 22 | 163.6 | 152.1 | 123.9 | 0.84 |
| 0.2% mixture 23 | 163.7 | 152.6 | 123.5 | 0.88 |

TABLE 18

Illustrates the peak melting and crystallization temperatures and k-value of PP-homopolymer (MFI 11 g/10 min) mixed with modified calcium aluminium hydroxy carbonate

| β4 | $T_m$ Alpha (° C.) | $T_m$ Beta (° C.) | Tc (° C.) | k-value |
|---|---|---|---|---|
| 0.1% mixture 24 | 164 | 153.1 | 125.3 | 0.91 |
| 0.2% mixture 25 | 164.3 | 152.9 | 125.9 | 0.89 |

TABLE 19

Illustrates the peak melting and crystallization temperatures and k-value of PP-homopolymer (MFI 11 g/10 min) mixed with modified calcium aluminium hydroxy carbonate

| β5 | $T_m$ Alpha (° C.) | $T_m$ Beta (° C.) | Tc (° C.) | k-value |
|---|---|---|---|---|
| 0.1% mixture 26 | 162.1 | 154.2 | 123.2 | 0.93 |
| 0.2% mixture 27 | 161.7 | 154.0 | 123.6 | 0.95 |

From the inventive examples it has been found and confirmed that modified calcium aluminium hydroxy carbonate imparted high beta form in polypropylene.

TABLE 20

Illustrates the peak melting and crystallization temperatures and k-value of PP-homopolymer (MFI 11 g/10 min) mixed with calcium aluminium hydroxy carbonate and pimelic acid

| β6 | $T_m$ Alpha (° C.) | $T_m$ Beta (° C.) | Tc (° C.) | k-value |
|---|---|---|---|---|
| 0.1% mixture 28 | 162.2 | 151.4 | 124.5 | 0.55 |

In order to determine whether modified calcium aluminium hydroxy carbonate retains its acid scavenging property, chloride test was carried out. Total chloride, free chloride and bonded chloride contents were determined as per established industry procedure. Two formulations containing two different commercial acid scavengers (calcium stearate; CaSt and zinc stearates; ZnSt) 1000 ppm each were extruded on extruder at melt temperature of 230° C. A polypropylene (homopolymer) having MFI (03 g/10 min) was mixed with 0.35% pentaerthrityl-tetrakis(3-(3',5'-di-tert.Butyl-4-hydroxyphenyl)-propionate (supplied as Irganox 1010, BASF) and 0.70% tris(2,4-di-t-butyl-phenyl) phosphate (supplied as Irgafos 168, BASF).

TABLE 21

Shows the Acid scavenging efficacy of modified calcium aluminiumhydroxy carbonate in terms of Chloride content

| S. No. | Formulation | Total Chloride (ppm) | Free Chloride (ppm) | Bonded chloride (ppm) |
|---|---|---|---|---|
| 1 | 0.1% mixture 3 | 21.9 | 7.4 | 14.5 |
| 2 | 0.1% mixture 18 | 19.5 | 6.3 | 13.2 |
| 3 | 0.1% mixture 24 | 20.4 | 7.1 | 13.3 |
| 4 | PP - 1000 ppm CaSt | 20.1 | 5.1 | 15.0 |
| 5 | PP - 1000 ppm ZnSt | 19.7 | 6.3 | 13.4 |

From table 21, modified calcium aluminium hydroxy carbonate acts as efficient acid scavenger by trapping residual chloride generated due to catalyst residue.

We claim:
1. A process for modification of acid scavenger to be used as dual functional additive as acid scavenger as well as crystallinity modifier in polyolefins, said process comprising:
   treating an acid scavenger with an organic dibasic acid at a temperature in the range of 140° C. to 160° C. without any solvent in a dry method to obtain a modified acid scavenger, wherein the acid scavenger is calcium aluminium hydroxy carbonate having chemical formula $Ca_4Al_2(OH)_{12}CO_3 \cdot nH_2O$, where n=4-5.

2. The process as claimed in claim 1, wherein the dibasic acid is selected from the group comprising of pimelic acid, suberic acid, azelaic acid, o-phthalic acid, terephthalic acid and combination thereof.

3. The process as claimed in claim 1, wherein the treatment is carried out for a period of time in the range of 30 minutes to 3 hours.

4. The process as claimed in claim 1, wherein weight ratio of acid scavenger to dibasic organic acid is in the range of 10:10-0.1.

5. The process as claimed in claim 1, wherein mole ratio of acid scavenger to dibasic organic acid is in the range of 10:10-0.1.

6. The process as claimed in claim 1, wherein the modified acid scavenger is subject to milling treatment to obtain a fine powder having a weight average particle size of from 1 to 10 µm.

7. The process as claimed in claim 1, wherein the modified acid scavenger is used as acid scavenger as well as crystallinity modifier in polyolefins and is used in amounts of from 0.001 to 5 wt %, on the basis of the polyolefins content.

\* \* \* \* \*